US007611404B1

(12) United States Patent (10) Patent No.: US 7,611,404 B1
Hilf et al. (45) Date of Patent: Nov. 3, 2009

(54) POKER GAME SYSTEM HAVING BAD BEAT POT AND METHOD OF CONDUCTING THE SAME

(75) Inventors: Peter M. Hilf, San Diego, CA (US); Luis Esparza, Santa Barbara, CA (US)

(73) Assignee: Pollux LLC, Santa Barbara, CA (US)

( * ) Notice: Subject to any disclaimer, the term of this patent is extended or adjusted under 35 U.S.C. 154(b) by 0 days.

(21) Appl. No.: 12/406,862

(22) Filed: Mar. 18, 2009

(51) Int. Cl.
*A63F 13/00* (2006.01)

(52) U.S. Cl. ............................ 463/13; 463/20; 463/26; 273/292

(58) Field of Classification Search ............. 463/10-13, 463/16-22, 25, 29, 40-42, 26-28; 273/138.1, 273/139, 142 B, 142 A, 142 J, 148 A, 148 R, 273/148 B, 149 P, 149 R, 274, 292-293, 273/304, 306, 309
See application file for complete search history.

(56) References Cited

U.S. PATENT DOCUMENTS

| | | | | |
|---|---|---|---|---|
| 5,871,213 | A * | 2/1999 | Chadband et al. | 273/292 |
| 6,227,969 | B1 * | 5/2001 | Yoseloff | 463/13 |
| 6,938,900 | B2 * | 9/2005 | Snow | 273/292 |
| 7,056,208 | B2 | 6/2006 | Cogert | |
| 7,448,630 | B1 * | 11/2008 | Lam et al. | 273/292 |
| 2005/0032563 | A1 * | 2/2005 | Sines | 463/13 |
| 2005/0032564 | A1 * | 2/2005 | Sines | 463/13 |
| 2006/0052148 | A1 * | 3/2006 | Blair et al. | 463/13 |
| 2006/0131809 | A1 * | 6/2006 | Lancaster et al. | 273/292 |
| 2006/0131810 | A1 * | 6/2006 | Nicely | 273/292 |
| 2006/0246976 | A1 * | 11/2006 | Sines | 463/13 |
| 2006/0284376 | A1 * | 12/2006 | Snow | 273/292 |
| 2007/0045957 | A1 * | 3/2007 | Blair, Jr. | 273/274 |
| 2008/0007003 | A1 * | 1/2008 | Davis et al. | 273/292 |

* cited by examiner

*Primary Examiner*—Peter DungBa Vo
*Assistant Examiner*—Arthur O. Hall
(74) *Attorney, Agent, or Firm*—Greenberg Traurig

(57) ABSTRACT

A card game method and system having multiple pots. A first conventional pot is created using wagers placed prior to a final common card or game card and the second pot is created using wagers placed after a final common card or game card is dealt or provided. A player holding a winning poker hand wherein all but the final card is available to form a poker hand wins the first pot. The second pot or at least a portion thereof is won by a player holding a winning hand wherein all common cards are available to form a poker hand. Alternatively, the first and second pots may be paid in the opposite manner or in other designated manners. A jackpot is also conceivable as set forth herein.

15 Claims, 6 Drawing Sheets

POKER GAME SYSTEM HAVING BAD BEAT POT AND METHOD OF CONDUCTING THE SAME

FIELD OF THE INVENTION

The embodiments of the present invention relate to a poker wagering system with a bad beat pot.

BACKGROUND

With television coverage and online poker websites, poker has become extremely popular. Accordingly, poker attracts larger player pools and prize money. Despite the popularity, poker continues to suffer from drawbacks. One primary drawback to poker is the bad beat. Bad beats occur when a poker hand having a high probability of winning ultimately loses. For example, in Texas Hold'em, bad beats typically occur when a low probability river card appears to turn a high probability winning hand into a losing hand.

Poker rooms utilize bad beat jackpots to combat the occurrence of bad beats. In most instances, the bad beat jackpots are premised on a first four of a kind losing to a stronger, second four of a kind. The bad beat jackpots are split among all players at the relevant poker table. However, the bad beat jackpots are rarely won since the likelihood of two four of kinds occurring on the same hand is extremely rare.

Thus, there is a need for a more versatile poker game and useful bad beat type system. Advantageously, the bad beat system should be applicable to any poker game utilizing common cards and multiple betting rounds.

SUMMARY

Accordingly, a first embodiment of the present invention is a method of conducting a poker game comprising: providing a deck of cards, card table and a dealer; providing multiple players with one or more concealed cards; providing multiple common cards during said game in a manner allowing at least three betting rounds to occur; placing bets from each betting round occurring prior to a final common card being provided into a first pot; placing bets from a betting round occurring after the final common card being provided into a second pot; paying said first pot to a player holding a winning poker hand after all but a final common card is provided; and paying said second pot to a player holding a winning poker hand after all common cards are provided.

A Texas Hold'em embodiment of the present invention comprises: providing multiple players with two hole cards; conducting a first betting round; placing bets from said first betting round into a first pot; providing three common cards; conducting a second betting round; placing bets from said second betting round into said first pot; providing a fourth common card; conducting a third betting round; placing bets from said third betting round into said first pot; providing a fifth and final common card; conducting a fourth betting round; placing bets from said fourth betting round into a second pot; paying said first pot to a player holding a winning poker hand after the fourth common card is provided; and paying said second pot to a player holding a winning poker hand after the fifth and final common card is provided.

Another embodiment of the present invention is a card game system comprising: a card table; a deck of conventional playing cards; and a dealer, said dealer instructed to deal multiple players positioned at said card table one or more concealed cards from said deck of conventional playing cards; deal multiple common cards from said deck of conventional playing cards in a manner allowing at least three betting rounds to occur; place bets from each betting round occurring prior to a final common card being dealt into a first pot; place bets from a betting round occurring after the final common card being dealt into a into a second pot; pay said first pot to a player holding a winning poker hand after all but the final common card is provided; and pay said second pot to a player holding a winning poker hand after the final common card is provided.

Another embodiment of the present invention is a card game system comprising: a card table, a deck of conventional playing cards; and a dealer, said dealer instructed to deal multiple players positioned at said card table two hole cards; conduct a first betting round; place bets from said first betting round into a first pot; deal three common cards; conduct a second betting round; place bets from said second betting round into said first pot; deal a fourth common card; conduct a third betting round; place bets from said third betting round into said first pot; deal a fifth and final common card; conduct a fourth betting round; place bets from said fourth betting round into a second pot; pay said first pot to a player holding a winning poker hand after the fourth common card is provided; and pay said second pot to a player holding a winning poker hand after the fifth and final common card is provided.

Another embodiment of the present invention is an electronic card game system configured for play over a computer network accessible by player terminals, said terminals including at least a display and user interface, comprising: computer means programmed to: randomly select and cause to be displayed from a simulated deck of conventional playing cards one or more hole cards to multiple players accessing said computer network; cause to be displayed multiple common cards from said simulated deck of conventional playing cards in a manner allowing at least three betting rounds to occur; place bets from each betting round occurring prior to causing a final common card to be displayed from said simulated deck of cards into a first pot; place bets from a betting round occurring after causing the final common card to be displayed into a second pot; pay said first pot to a player holding a winning poker hand after all but a final common card is provided; and pay said second pot to a player holding a winning poker hand after all common cards are provided.

Another embodiment of the present invention is an electronic card game system configured for play over a computer network accessible by player terminals, said terminals including at least a display and user interface, comprising: computer means programmed to: deal multiple players positioned at a virtual card table two hole cards; conduct a first betting round; place bets from said first betting round into a first pot; deal three common cards; conduct a second betting round; place bets from said second betting round into said first pot; deal a fourth common card; conduct a third betting round; place bets from said third betting round into said first pot; deal a fifth and final common card; conduct a fourth betting round; place bets from said fourth betting round into a second pot; pay said first pot to a player holding a winning poker hand after the fourth common card is provided; and pay said second pot to a player holding a winning poker hand the fifth and final common card is provided.

With the embodiments of the present invention, players have two opportunities to win a pot. In one embodiment, a player can win a pot (i.e., the first pot) despite being beaten by the final common card.

Other variations, embodiments and features of the present invention will become evident from the following detailed description, drawings and claims.

DETAILED DESCRIPTION

Figure 1:
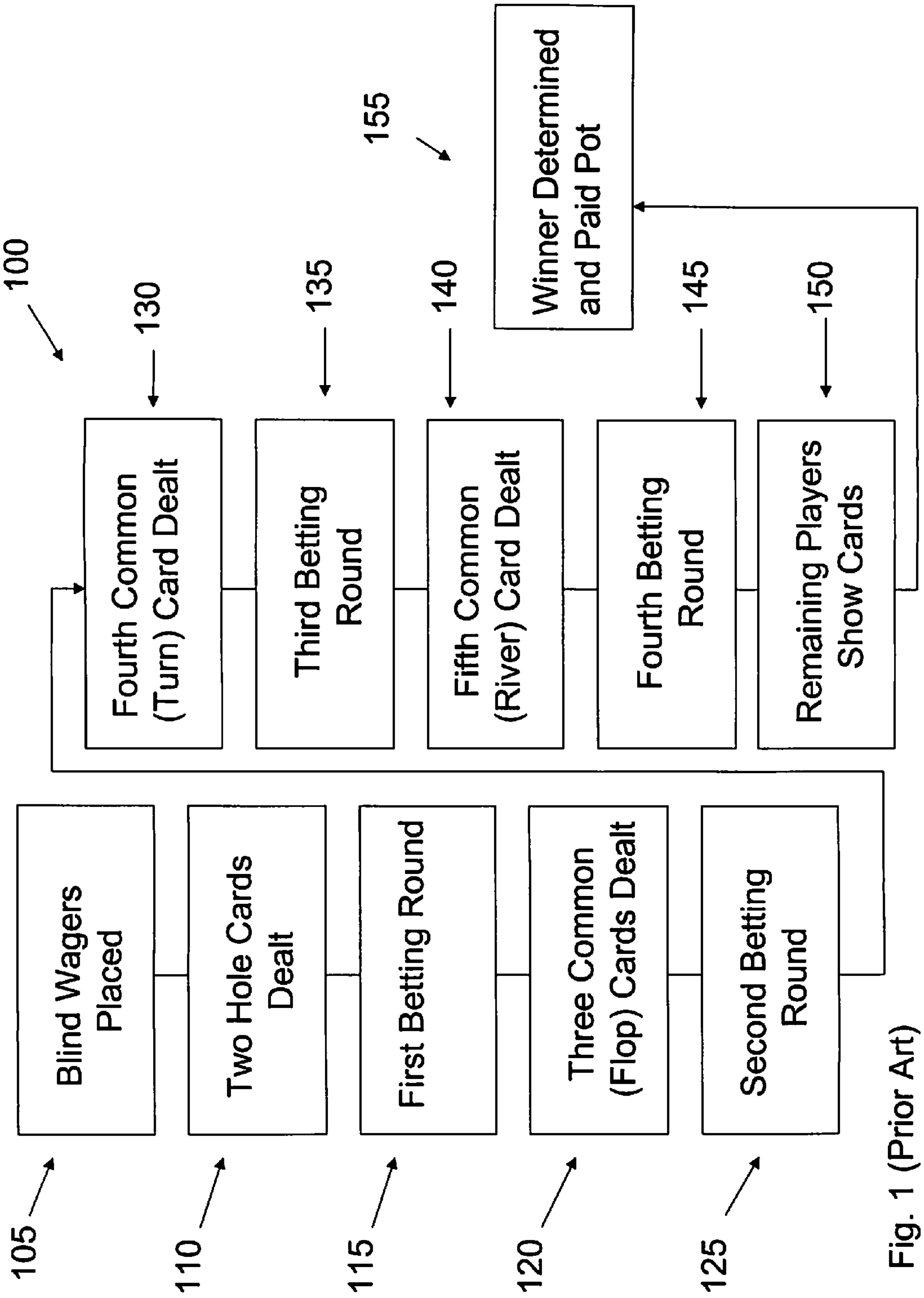
Fig. 1 (Prior Art)
FIG. 1 illustrates a flow chart detailing a conventional Texas Hold'em poker game.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

The embodiments of the present invention relate to the game of poker. While the embodiments of the present invention are suitable for any poker game utilizing common cards (e.g., Omaha), the game of Texas Hold'em is used herein to describe the game. The embodiments are also suitable for seven card and five card stud games and the like. The embodiments of the present invention are directed to forming multiple pots and easing the impact of a bad beat wherein a player loses based on a last dealt card. The impact of multiple pots also influences betting schemes and bluffing opportunities.

FIG. 1 shows a flow chart 100 detailing a method of conducting a conventional game of Texas Hold'em. At 105, a first player places a small blind wager and a second adjacent player places a big blind wager. The small and big blind wagers are used to start a pot and keep players in the hand. At 110, each player is dealt two hole cards from a deck of cards. At 115, a first betting round is conducted with bets being placed in the pot started with the small and big blind wagers. At 120, three common cards are dealt (i.e., the flop). At 125, a second betting round is conducted with bets being placed into the single pot. At 130, a fourth common card is dealt (i.e., the turn). At 135, a third betting round is conducted with bets being placed into the single pot. At 140, a fifth and final common card is dealt (i.e., the river). At 145, a fourth betting round is conducted with bets being placed into the single pot. At 150, remaining players show their hole cards. At 155, the dealer determines the winning hand and pays the player the pot. While not shown in the flow chart 100, the house, via the dealer, collects a rake or portion of the pot as payment for conducting the game.

Figure 2:
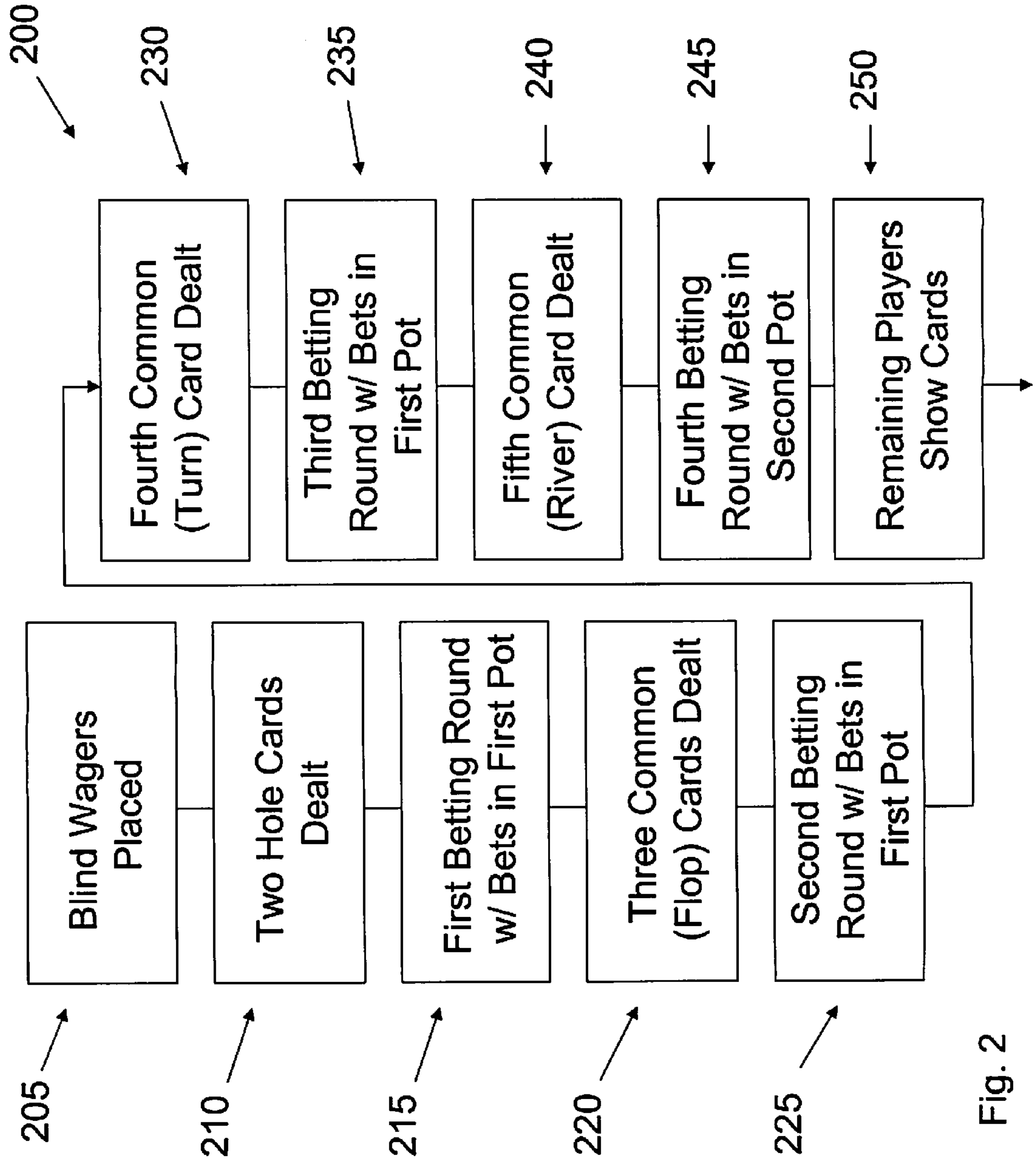
FIG. 2 illustrates a flow chart detailing a Texas Hold'em poker game according to a first embodiment of the present invention.
Figure 2:
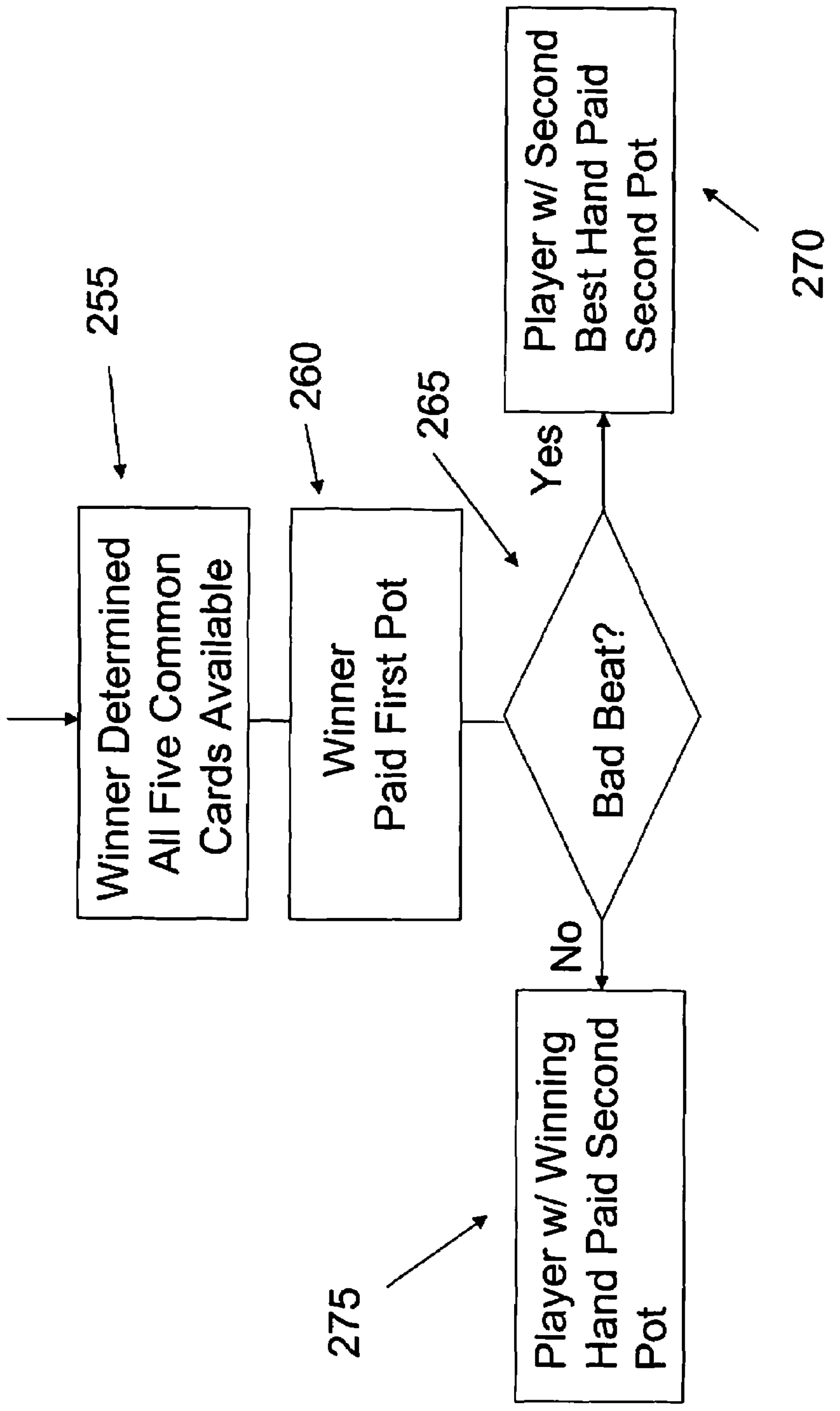

FIG. 2 shows a flow chart 200 detailing a method of conducting a game of Texas Hold'em according to a first embodiment of the present invention. At 205, a first player places a small blind wager and a second player places a big blind wager at a designated card table. At 210, each player is dealt two hole cards from a deck of cards by a game dealer. At 215, a first betting round is conducted with bets being placed in a first pot started with the small and big blind wagers. At 220, three common cards are dealt. At 225, a second betting round is conducted with bets being placed into the first pot. At 230, a fourth common card is dealt. At 235, a third betting round is conducted with bets being placed into the first pot. At 240, a fifth and final common card is dealt. At 245, a fourth betting round is conducted with bets being placed into a second pot. At 250, remaining players show their hole cards. At 255, the dealer determines the winning five-card poker hand using the four common cards (i.e., flop and turn) in combination with each remaining player's two hole cards. At 260, the player holding the winning poker hand after the turn is paid the first pot. At 265, the dealer determines the winning five-card poker hand using the five common cards (i.e., flop, turn and river) in combination with each remaining player's two hole cards. At 270, the player holding the winning poker hand after the river is paid the second pot. It is apparent that the same player will win both the first and second pots when the same player is leading after the turn and river and in the event all but one player folds. That is, if only one player remains after the betting round after the river, he or she wins all pots. Accordingly, to be eligible for either pot, the player must remain in the game until the end. In other instances, the first pot acts as a bad beat pot providing a payout to a player that is leading the hand after the turn but loses the final hand based on the rank and suit of the river card.

Figure 3:
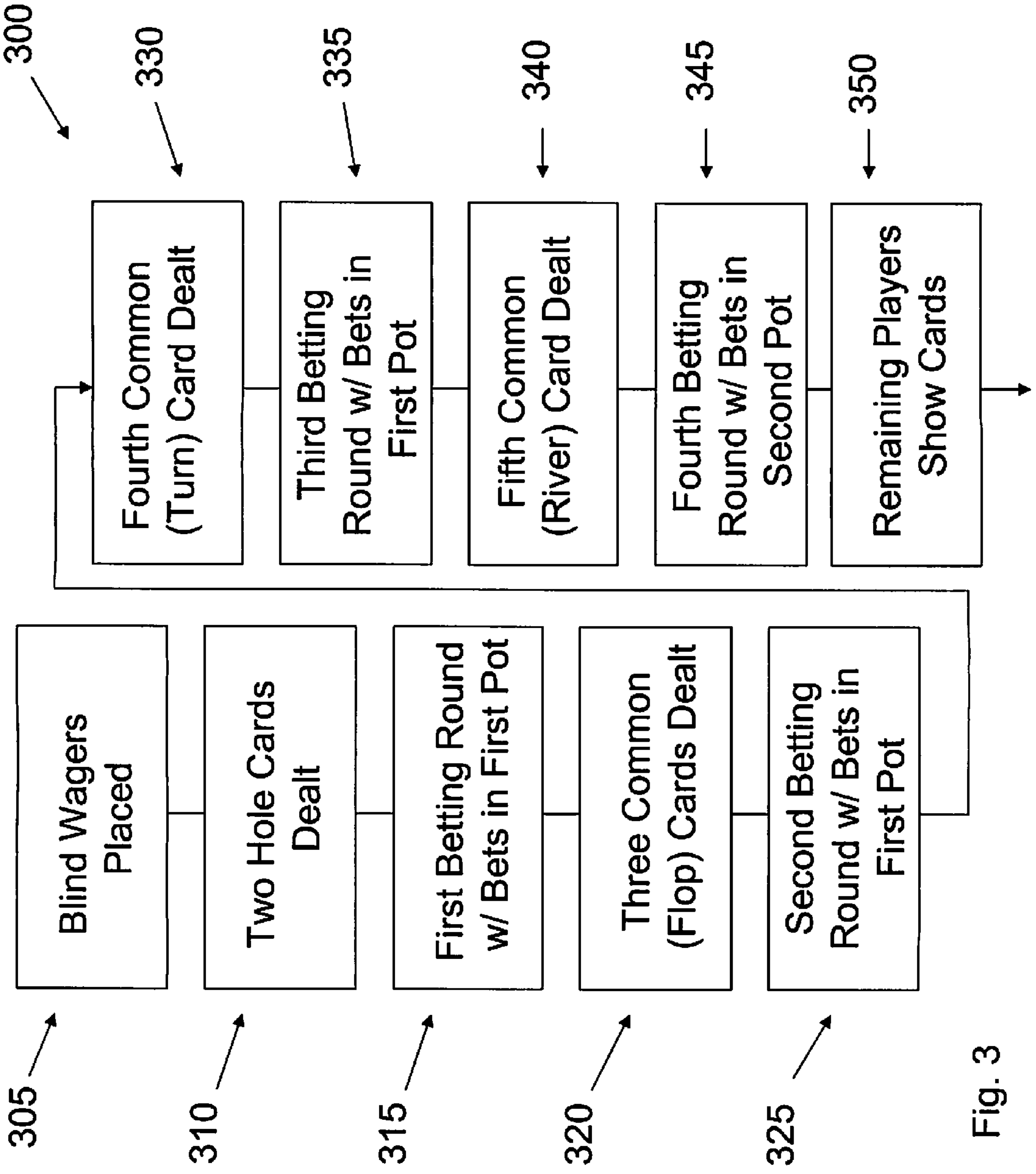
FIG. 3 illustrates a flow chart detailing a Texas Hold'em poker game according to a second embodiment of the present invention.
Figure 3:
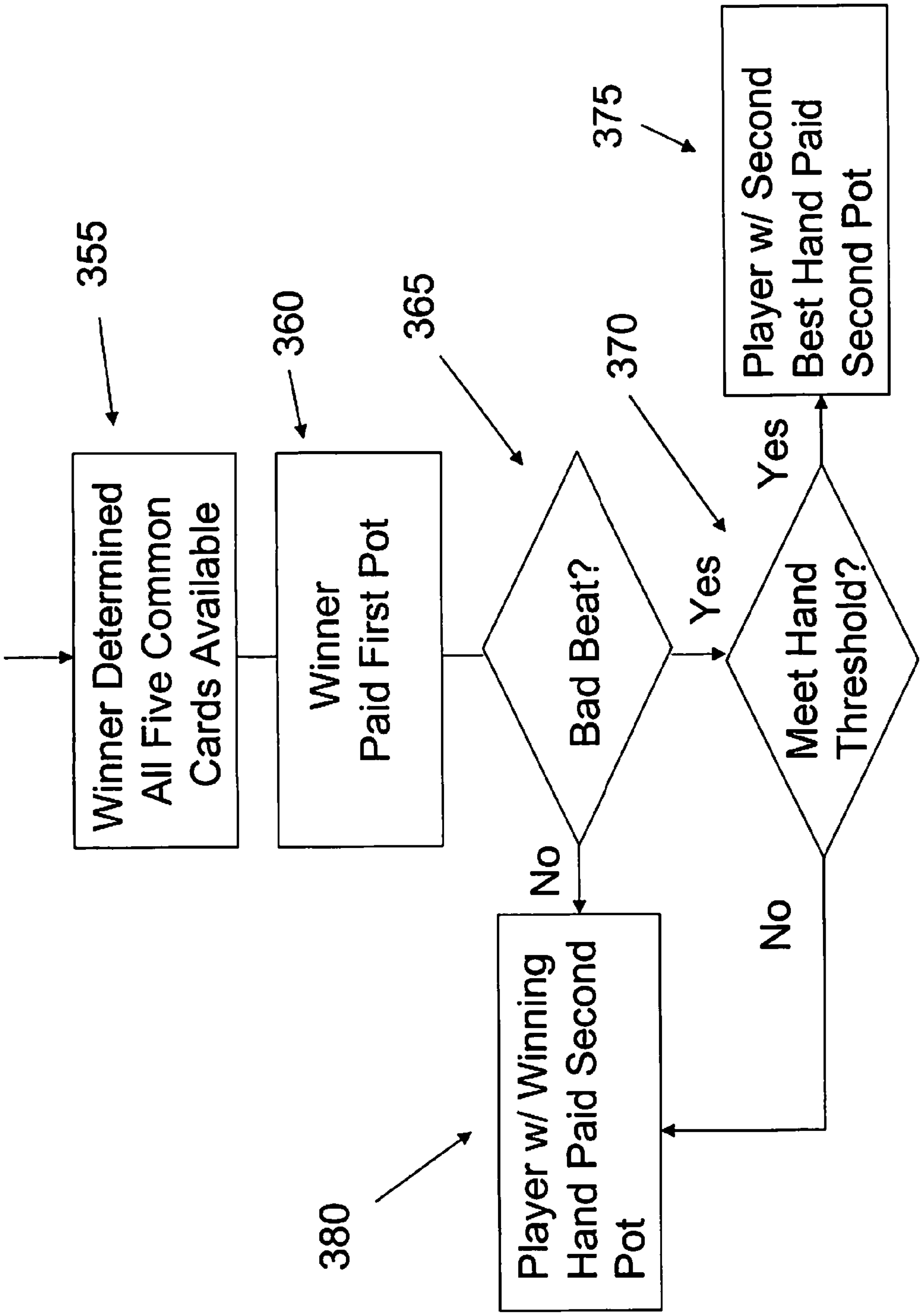

FIG. 3 shows a flow chart 300 detailing a method of conducting a game of Texas Hold'em according to a second embodiment of the present invention. At 305, a first player places a small blind wager and a second player places a big blind wager at a designated card table. At 310, each player is dealt two hole cards from a deck of cards by a game dealer. At 315, a first betting round is conducted with bets being placed in a first pot started with the small and big blind wagers. At 320, three common cards are dealt. At 325, a second betting round is conducted with bets being placed into the first pot. At 330, a fourth common card is dealt. At 335, a third betting round is conducted with bets being placed into the first pot. At 340, a fifth and final common card is dealt. At 345, a fourth betting round is conducted with bets being placed into a second pot. At 350, remaining players show their hole cards. At 355, the dealer determines the winning five-card poker hand using the four common cards (i.e., flop and turn) in combination with each remaining player's two hole cards. At 360, the dealer determines if the winning poker hand after the turn is above a threshold rank (e.g., straight) after the turn. If so, at 365, if the hand is above the threshold rank, the player holding the winning poker hand after the turn is paid the first pot. If not, at 370, the first and second pots are combined. At 375, the dealer determines the winning five-card poker hand after the river card and, at 380, the player holding the winning five-card poker hand after the river is paid the second pot.

Figure 4:
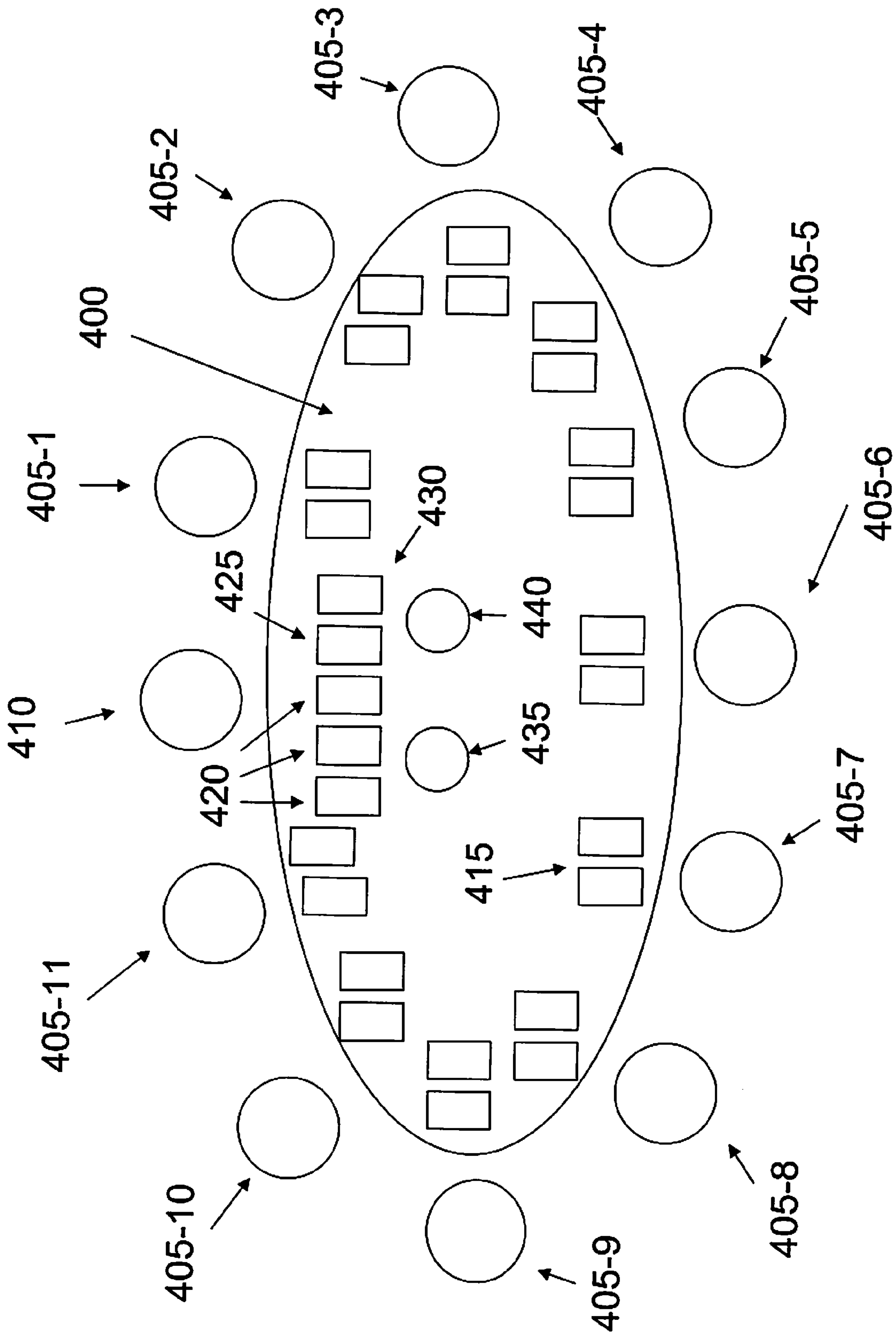
FIG. 4 illustrates an exemplary poker table layout which may facilitate the embodiments of the present invention.

FIG. 4 shows an exemplary poker table layout 400 which may facilitate the embodiments of the present invention. Table 400 accommodates eleven player positions 405-1 through 405-11 and a dealer position 410. As shown, each player position 405-1 through 405-12 shows two hole cards 415 and five common cards, including the flop cards 420, turn card 425 and river card 430 are shown in a center position on the table 400. A first pot area 435 and bad beat or second pot area 440 in the form of circle markings are depicted near a center position of the table 400 as well. The first pot area 435 and second pot area 440 provide a convenient mechanism for the dealer to create and separate the two pots. Those skilled in the art will recognize that other means may be used to separate the pots or the dealer may simply create two pots and maintain them separately without any visible table markings.

While the discussion above focuses on poker games involving common cards, the embodiments are also suitable for other poker games including seven card and five card stud.

In such instances, the second pot is created using wagers placed after the seventh or fifth card, respectively. For example, with a seven card stud game, a first pot is generated using blind wagers, if any, and wagers placed during betting rounds while the first six cards are dealt and the second pot is generated using wagers placed after the seventh and final card is dealt.

In one embodiment, the second pot only comes into play in a heads-up conclusion. That is, only when two players finish the game. In other words, if more than two players finish the game (i.e., show their cards to determine the winner), the first and second pots are combined into a single pot and the game concludes in a conventional fashion.

In another embodiment, a jackpot is present in the game of Texas Hold'em version and promoted under the fanciful name Jesse James Hold'em. The jackpot is premised on playing cards having ranks of 4 and 5—to signify a .45 caliber weapon like that apparently used by Jesse James and/or the number of the turn and river cards relative to the common cards. Players holding pockets 4s or 5s may win a small jackpot while player achieving final hands comprising full houses comprising 4s and 5s may win a larger jackpot.

While the flow charts depict the second pot being paid to the player leading after the river card, it is also possible that the player may receive only a portion of the second pot. For example, in one embodiment, the player may be returned his or her final wager or receive a pre-established percentage (e.g., 25% or 75%) of the second pot while the remaining portion goes to the player winning after the turn. Those skilled in the art will recognize that the first and second pots may be paid in the opposite manner (i.e., first pot to the player holding the best hand after the river and the second pot to the player holding the best hand after the turn). Alternatively, a largest of the two pots may be played to one player while the smaller pot is then paid to a different player. For example, the larger pot may be paid to the player leading after the turn while the smaller pot may be paid to the player leading after the river, or vice versa.

Also, although the description above is directed to a live game of poker, it will be recognized by those skilled in the art that the embodiments are suitable for electronically-implemented poker games including stand alone gaming machines and online poker games. With online poker games, the embodiments are programmed into software driving online poker websites such that the first and second pots are automatically created, combined and/or disbursed. Online poker websites allow players to access online poker games via a computer terminal in the form of a display and interface (PC, cellular telephone, PDA, etc.). An Internet server hosts the website and via computer means (e.g., processor, micro-controller or similar device) controls the poker game utilizing software and randomizing means.

Although the invention has been described in detail with reference to several embodiments, additional variations and modifications exist within the scope and spirit of the invention as described and defined in the following claims.

We claim:

1. A method of conducting a poker game comprising:
- providing a deck of playing cards, card table and a dealer;
- providing multiple players with one or more concealed cards from said deck of cards;
- providing multiple common cards during said game in a manner allowing at least three betting rounds to occur during a hand of poker;
- placing bets into a first pot from each betting round occurring prior to a final common card being provided during said hand of poker;
- placing bets into a second pot from a betting round occurring after the final common card being provided during said hand of poker;
- paying said first pot to a player holding a winning poker hand wherein all but the final common card are available to form a poker hand; and
- paying said second pot to a player holding a winning poker hand wherein all common cards are available to form a poker hand.

2. The method of claim 1 wherein the poker game is Texas Hold'em or Omaha.

3. The method of claim 1 facilitated by electronic means.

4. The method of claim 1 further comprising utilizing both pots only when the game ends heads-up.

5. The method of claim 1 further comprising combining the first and second pot when the winning poker hand using all but the final common card fails to exceed a threshold rank and paying the combined pot to a player holding a winning poker hand wherein all of the common cards are available to form a poker hand.

6. A card game system comprising:
- a card table;
- a deck of conventional playing cards; and
- a dealer,
  - said dealer instructed to deal multiple players positioned at said card table one or more concealed cards from said deck of conventional playing cards;
  - deal multiple common cards from said deck of conventional playing cards in a manner allowing at least two betting rounds to occur during a hand of poker;
  - place bets into a first pot from each betting round occurring prior to a final common card being dealt during said hand of poker;
  - place bets into a second pot from a betting round occurring after the final common card being dealt during said hand of poker;
  - pay said first pot to a player holding a winning poker hand wherein all but the final common cards are available to form a poker hand; and
  - pay said second pot to a player holding a winning poker hand wherein all of the common cards are available to form a poker hand.

7. The card game system of claim 6 wherein said dealer is further instructed to deal Texas Hold'em or Omaha.

8. The card game system of claim 6 wherein the dealer is further instructed to utilize both pots only when the game ends heads-up.

9. The card game system of claim 6 further instructing the dealer to combine the first and second pot when the winning poker hand using all but the final common card fails to exceed a threshold rank and pay the combined pot to a player holding a winning poker hand wherein all of the common cards are available to form a poker hand.

10. An electronic card game system configured for play over a computer network accessible by player terminals, said terminals including at least a display and user interface, comprising:
- computer means programmed to:
  - randomly select and cause to be displayed from a simulated deck of conventional playing cards one or more hole cards to multiple players accessing said computer network;
  - cause to be displayed multiple common cards from said simulated deck of conventional playing cards in a manner allowing at least two betting rounds to occur during a hand of poker;

place bets into a first pot from each betting round occurring prior to causing a final common card to be displayed from said simulated deck of cards during said hand of poker;

place bets into a second pot from a betting round occurring after causing the final common card to be displayed during said hand of poker;

pay said first pot to a player holding a winning poker hand wherein all but the final common cards are available to form a poker hand; and pay said second pot to a player holding a winning poker hand wherein all of the common cards are available to form a poker hand.

11. The electronic card game system of claim 10 wherein said computer means is further programmed to deal Texas Hold'em or Omaha.

12. The electronic game system of claim 10 wherein said via computer means is further programmed to utilize both pots only when the game ends heads-up.

13. The electronic game system of claim 10 wherein the player terminals are PCs, cellular telephones and PDAs.

14. The card game system of claim 10 wherein said computer means to further programmed to combine the first and second pot when the winning poker hand using all but the final common card fails to exceed a threshold rank and pay the combined pot to a player holding a winning poker hand wherein all of the common cards are available to form a poker hand.

15. The card game system of claim 10 wherein said computer means is a processor.

* * * * *